United States Patent
Lieske, Jr. et al.

(10) Patent No.: US 8,676,789 B2
(45) Date of Patent: *Mar. 18, 2014

(54) SYSTEMS AND METHODS TO SORT INFORMATION RELATED TO ENTITIES HAVING DIFFERENT LOCATIONS

(71) Applicant: Yellowpages.com LLC, Glendale, CA (US)

(72) Inventors: Jay H. Lieske, Jr., Los Angeles, CA (US); Stephen Chappell, Los Angeles, CA (US)

(73) Assignee: Yellowpages.com LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/830,383

(22) Filed: Mar. 14, 2013

(65) Prior Publication Data

US 2013/0311460 A1   Nov. 21, 2013

Related U.S. Application Data

(63) Continuation of application No. 12/186,486, filed on Aug. 5, 2008, now Pat. No. 8,423,536.

(51) Int. Cl.
*G06F 17/30* (2006.01)

(52) U.S. Cl.
USPC ............ 707/722; 707/723; 707/725; 707/735

(58) Field of Classification Search
None
See application file for complete search history.

(56) References Cited

U.S. PATENT DOCUMENTS

| | | | |
|---|---|---|---|
| 5,819,286 A | 10/1998 | Yang et al. | |
| 5,850,433 A | 12/1998 | Rondeau | |
| 5,966,126 A | 10/1999 | Szabo | |
| 6,026,375 A | 2/2000 | Hall et al. | |
| 6,070,083 A | 5/2000 | Watters et al. | |
| 6,133,853 A | 10/2000 | Obradovich et al. | |
| 6,326,962 B1 | 12/2001 | Szabo | |
| 7,024,205 B1 | 4/2006 | Hose | |
| 7,376,433 B1 | 5/2008 | Hose | |
| 7,621,846 B2 * | 11/2009 | Ainsworth et al. | 482/8 |
| 7,689,466 B1 | 3/2010 | Benbrahim et al. | |
| 7,831,595 B2 | 11/2010 | Suresh et al. | |
| 2003/0061211 A1 | 3/2003 | Shultz et al. | |
| 2004/0162738 A1 | 8/2004 | Sanders et al. | |
| 2004/0229730 A1 | 11/2004 | Ainsworth et al. | |
| 2005/0065959 A1 | 3/2005 | Smith et al. | |
| 2006/0155751 A1 | 7/2006 | Geshwind et al. | |
| 2006/0229807 A1 | 10/2006 | Sheha et al. | |
| 2007/0214133 A1 | 9/2007 | Liberty et al. | |
| 2008/0076451 A1 | 3/2008 | Sheha et al. | |
| 2008/0082578 A1 | 4/2008 | Hogue et al. | |

(Continued)

OTHER PUBLICATIONS

Office Action issued on Feb. 4, 2011, in U.S. Appl. No. 12/186,486, filed Aug. 5, 2008, 24 pages.

*Primary Examiner* — Anteneh Girma

(74) *Attorney, Agent, or Firm* — Kilpatrick & Townsend & Stockton LLP

(57) ABSTRACT

Systems and methods sort location dependent information based on selecting multiple groups of information according to location, ordering the groups based on location, and ordering the information within the groups based on at least one or more other criteria. The size(s) of the areas used to select the groups may be predetermined, or dynamically determined (e.g., based on clustering of information along distance to a location of interest).

20 Claims, 5 Drawing Sheets

(56) References Cited

U.S. PATENT DOCUMENTS

| | | |
|---|---|---|
| 2008/0195605 A1 | 8/2008 | Wolf-Soffer |
| 2008/0243756 A1 | 10/2008 | Moon et al. |
| 2008/0270220 A1 | 10/2008 | Ramer et al. |
| 2008/0307053 A1* | 12/2008 | Mitnick et al. ............ 709/205 |
| 2009/0076886 A1 | 3/2009 | Dulitz et al. |
| 2009/0109022 A1 | 4/2009 | Gangopadhyay et al. |
| 2009/0307018 A1 | 12/2009 | Chappell et al. |
| 2010/0036806 A1 | 2/2010 | Lam et al. |
| 2010/0169179 A1 | 7/2010 | Ramer et al. |
| 2010/0274753 A1 | 10/2010 | Liberty et al. |

* cited by examiner

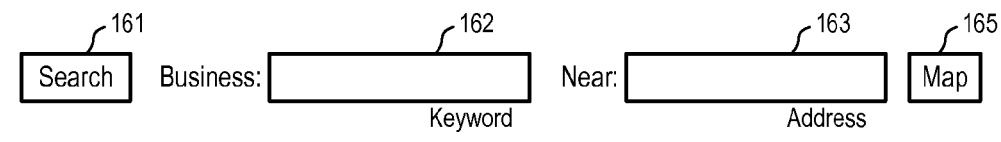

150

| 161 | 162 | 163 | 165 |
| Search | Business: [ Keyword ] | Near: [ Address ] | Map |

Hybrid Cars　　　★★★★☆ 151

101 Ocean View
San Francisco, CA 93415 (0.2 mi, Map)
1-415-281-1157 (Call or Email)　155
153

Based on 7 reviews
Rate it | Read reviews　157
[ More options ▽ ]

Imported Cars　　　★★★☆☆

102 Ocean View
San Francisco, CA 93415 (0.1 mi, Map)
1-415-281-3765 (Call or Email)

Based on 7 reviews
Rate it | Read reviews
[ More options ▽ ]

• • •

European Cars　　　★★★★★

102 Bay view
San Francisco, CA 93421 (1.1 mi, Map)
1-415-781-2513 (Call or Email)

Based on 7 reviews
Rate it | Read reviews
[ More options ▽ ]

SYSTEMS AND METHODS TO SORT INFORMATION RELATED TO ENTITIES HAVING DIFFERENT LOCATIONS

CROSS-REFERENCES TO RELATED APPLICATIONS

This application is a continuation of U.S. Ser. No. 12/186,486 filed on Aug. 5, 2008, entitled "SYSTEMS AND METHODS TO SORT INFORMATION RELATED TO ENTITIES HAVING DIFFERENT LOCATIONS", the entire disclosure of which is incorporated herein by reference for all purposes.

FIELD OF THE TECHNOLOGY

At least some embodiments disclosed herein relate to sorting location dependent information for presentation to a user according to a sorted order.

BACKGROUND

An end user may be interested in information about entities at different locations, such as service providers of a particular category near the current location of the end user, or near a different location specified by the end user.

In one approach to present the service providers to the end user, an information provider may sort the entire list of service providers based on the distance between the location of interest to the end user and the locations of the businesses.

In another approach to present the service providers to the end user, an information provider may select only one subset of service providers that are located within a certain geographic area, and then sort and present the selected subset of service providers based on another criterion, as if the selected subset of service providers were at the same location. For example, the information provider may select a single subset of service providers from an area within a predetermined radius from the location of interest. Alternatively, the information provider may select a single subset of service providers from an area having the same postal code as the location of interest. Alternatively, the information provider may select a single subset of service providers from the same city and/or state as the location of interest.

BRIEF DESCRIPTION OF THE DRAWINGS

The embodiments are illustrated by way of example and not limitation in the figures of the accompanying drawings in which like references indicate similar elements.

FIG. 4 illustrates an example of presenting location dependent listings according to one embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present disclosure provide methods and systems to sort location dependent information based on selecting multiple groups of information according to location, ordering the groups based on location, and ordering the information within the groups based on at least one or more other criteria. The size(s) of the areas used to select the groups may be predetermined, or dynamically determined (e.g., based on clustering of information along distance to a location of interest). The disclosure includes methods and apparatuses which perform these methods, including data processing systems which perform these methods, and computer readable media containing instructions which when executed on data processing systems cause the systems to perform these methods.

Figure 1:
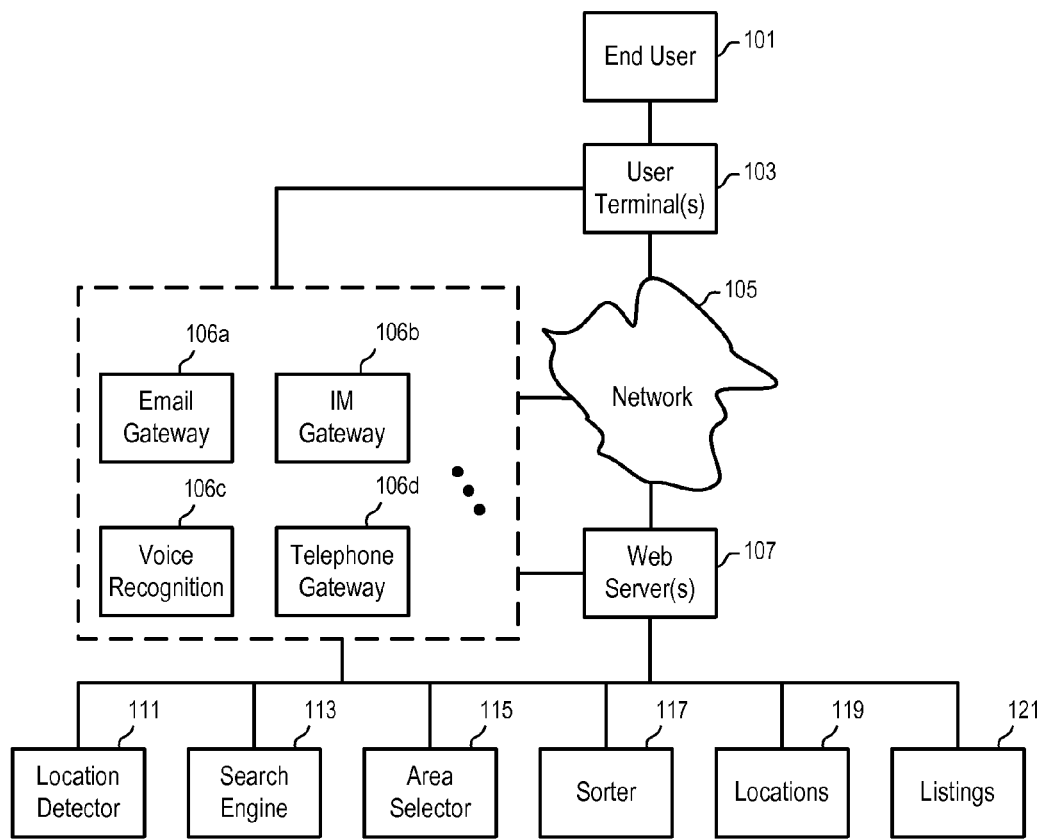
FIG. 1 shows a system to sort location dependent information according to one embodiment.

FIG. 1 shows a system to sort location dependent information according to one embodiment.

In FIG. 1, an end user (101) uses a user terminal (103) to submit a search request to a web server (107) over the network (105). The web server(s) (107) is (are) configured to communicate with a location detector (111), a search engine (113), an area selector (115), and a sorter (117) to process the search request and present search results based on the stored information, such as locations (119) and listings (121). The listings (121) are location dependent, having corresponding locations (119). The network (105) may include a local area network, a wireless data communication network, a telephone network, a cellular communication network, a telecommunication network, an interactive television network, an Internet Protocol Television (IPTV) network, an intranet, or a combination of networks, such as the Internet.

For example, listings (121) of businesses or people, such as restaurants, car dealers, retailer locations, service providers, gas stations, parking lots, plumbers, and the like, have their street addresses or other location parameters, such as longitude and latitude coordinates, stored as locations (119). The listings (121) may be for addresses, telephone numbers, advertisements, announcements, and/or events, etc. The locations (119) may be part of the listings (121), or associated with the listings (121). The listings (121) are generally information related to entities with corresponding locations (119). The entities may be businesses or people. Some of the entities may be advertisers who pay advertisement fees to promote their listings (121). Some of the entities may be non-advertisers who have free listings (121).

In one embodiment, the location detector (111) determines a location of interest to the end user (101) related to the search request. The end user (101) may explicitly specify the location of interest in the search request; and the location detector (111) extracts the location of interest from the search request.

Alternatively, the end user (101) may implicitly specify the location of interest based on a preference stored and associated with identification information of the end user (101) or the user terminal (103).

In some embodiments, the location detector (111) automatically identifies the location of interest based on determining the current location of the user terminal (103) that is used to submit the search request. For example, the location detector (111) may determine the location of the user terminal (103) based on a connection point the user terminal (103) used to access the network (105) (e.g., based on the location of a wireless network access point, or a base station of a cellular communication system). In some embodiments, the user terminal (103) automatically determines its current position (e.g., via a satellite positioning system, or a cellular positioning system) and transmits the determined position to the web server (107) with the search request, or provides the position in response to a request from the location detector (111).

In FIG. 1, the search engine (113) retrieves information stored about locations (119) and listings (121). In one embodiment, the area selector (115) selects a first geographic area based on the location of interest identified by the location detector (111). The search engine (113) then retrieves a first set of listings (121) that have locations (119) within the selected first geographic area and that satisfies the search criteria specified by the end user (101). The sorter (117) sorts the result according to at least one or more criteria different from sorting strictly based on a distance to the location of interest. The area selector (115), the search engine (113), and the sorter (117) repeat the operations to append one set of sorted results after another to generate a combined, sorted set of search results.

For example, the area selector (115) selects a second geographic area (e.g., a ring of area outside the first geographic area); the search engine (113) obtains a second set of search results from the second geographic area; and the sorter (117) sorts the second set of search results, using the same criteria used to sort the first set or different criteria, and appends the sorted second set to the sorted first set. The area selector (115), the search engine (113) and the sorter (117) repeat the operations to obtain multiple sorted sets, and append the sorted sets one after another according to the order of the geographic areas selected by the area selector (115) to generate a sorted set of search results.

In one embodiment, the area selector (115), the search engine (113) and the sorter (117) repeat the operations to select sets within selected regions and append the sorted sets one after another, until a desired target area is covered or searched, or until a sufficient number of results are obtained.

Alternatively, the search engine (113) may search for listings (121) in a target area to obtain a set of search results; the area selector (115) selects geographic areas and selects groups of results that are within the selected geographic areas respectively; and the sorter (117) sorts each of the groups of results according to at least one or more criteria that are not based on a distance to the location of interest; and the sorter (117) concatenates the groups of results in an order according to distance from the respective geographic areas to the location of interest. The criteria used by the sorter (117) may include the distance to the location of interest. For example, multiple parameters, including the distance to the location of interest, can be combined to generate a ranking indicator for the sorter (117) to sort each group or set of search results. Alternatively, the sorter (117) may sort each group according to a primary parameter (e.g., user ranking or advertisement fee) and a secondary parameter (e.g., the distance to the location of interest or popularity) for listings that have the same values for the primary parameters.

In one embodiment, the user terminal (103) is a data processing system, such as a notebook computer, a personal computer, a workstation, a network computer, a personal digital assistant (PDA), a mobile phone, a cellular phone, a television set with or without a set top box, a game console, an electronic kiosk, microprocessor-based or programmable consumer electronics, and the like.

In one embodiment, the user terminal (103) includes a web browser which allows the end user (101) to submit a search request to one of the web servers (107) for location dependent information, such as a listing (121) of businesses or people, such as restaurants, car dealers, retailer locations, service providers, gas stations, parking lots, plumbers, and the like. Alternatively, the user terminal (103) may provide the search request via other communication channels, such as email, short message service (SMS), instant messaging (IM), telephone connection, etc. For example, the user terminal (103) may provide the search request to an email gateway (106a) via email, or to an IM gateway (106b) via instant messaging, or to a telephone gateway (106d) via a telephone call. Some embodiments may use other types of gateways not shown in FIG. 1, such as gateways for SMS or gateways for television based data communication. Thus, the disclosure is not limited to the examples or combinations illustrated in FIG. 1.

In some embodiments, the end user (101) may use one user terminal (103) to submit the request and another user terminal (103) to receive the results. For example, the user (101) may submit the search request via an SMS message through user terminal (103), and receive the search request at another user terminal (103) via email. For example, the user may submit the search request via voice through user terminal (103) and receive the search request via a web page at another user terminal (103) or at the same user terminal (103). For example, in one embodiment, the user (101) may use a mobile phone as the user terminal (103) to transmit voice information, via a data connection through the network (105) and the web server (107) (or email gateway (106a), or IM gateway (106b), or other data communication gateways), or a telephone connection through a telephone gateway (106d)), to a voice recognition system (106c) to formulate a search and receive a web page or email at the same user terminal (103) or at another user terminal (103) that shows the result of the search.

In one embodiment, a same computer system implements the web servers (107), the location detectors (111), the search engine (113), the area selector (115) and the sorter (117). Alternatively, processes running on one or more shared computers may implement some of the components (107, 111, 113, 115, and 117). A same computing module, thread, or process may implement some of the components. In some embodiments, special purpose data processing systems implement the one or more of the components (107, 111, 113, 115, and 117), such as using Application-Specific Integrated Circuit (ASIC) or Field-Programmable Gate Array (FPGA). In some embodiments, processes running on general purpose data processing systems, such as general purpose personal computers or server computers, according to software instructions can implement the components (107, 111, 113, 115, and 117). Thus, the implementations are not limited to hardware, software, or particular combinations of hardware and software.

In one embodiment, one or more data processing systems store the information about the locations (119) and the listings (121). In one embodiment, one or more relational or object oriented databases, or flat files on one or more computers or networked storage devices store the information about the locations (119) and the listings (121). In some embodiments, a centralized system stores the information (119 and 121); alternatively, a distributed system, such as a peer to peer network, or Internet may host the information about the locations (119) and the listings (121).

Figure 2:
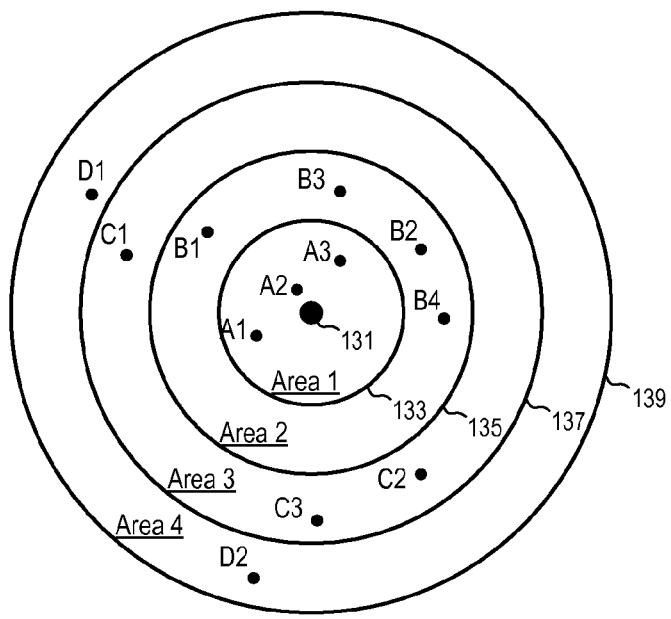
FIG. 2 illustrates a method to group location dependent information according to one embodiment.

FIG. 2 illustrates a method to group location dependent information according to one embodiment.

In FIG. 2, the area selector (115) defines a number of concentric areas (Area 1, Area 2, Area 3, and Area 4) that are centered at the location of interest (131). Some of the listings (121) (A1-A3, B1-B4, C1-C3 and D1-D2) satisfy the search criteria specified by the end user (101). According to the corresponding locations (119) of the listings (121), these listings (121) (A1-A3, B1-B4, C1-C3 and D1-D2) are located in different areas (Area 1-Area 4). The set of concentric circles (133, 135, 137 and 139) define the different areas (Area 1-Area 4) which group the location dependent information based on the areas in which the listings of the corresponding location dependent information are located. However, the area selector (115) is not limited to use concentric circles to define the areas.

In FIG. 2, Area 2 surrounds Area 1; and an average point in Area 1 is closer to the location of interest (131) than an average point in Area 2. Area 3 surrounds Area 2; and an average point in Area 1 or 2 is closer to the location of interest (131) than an average point in Area 3. Thus, Area 1 is closer to the location of interest (131) than Area 2; and Area 1 or 2 is closer to the location of interest (131) than Area 3. Since Area 2 is outside Area 1, the listings (121) (B1-B4) in Area 2 are ranked behind the listings (121) (A1-A3) in Area 1; since Area 3 is outside Area 2, the listings (121) (C1-C3) in Area 3 are ranked behind the listings (B1-B4) in Area 2.

In one embodiment, the radius difference in the concentric circles (e.g., 133, 135, 137, and 139) is more than 0.1 mile; and the area selector (115) may dynamically determine the sizes of the areas based on the population and distribution of the listings (121).

Although FIG. 2 illustrates an example to group listings (121) using concentric circles, some embodiments may use other types of areas. For example, the shape of the areas may be square, triangle, or irregular shapes. For example, the area selector (115) may scale a boundary of a city, a state, a country, a district, etc., to generate a shape of an area. In one embodiment, the area selector (115) may define the areas by estimated transportation distance, such as a driving distance or a walking distance, measured according to a map. In one embodiment, the area selector (115) may define the areas by estimated transportation time. In some embodiments, the area selector (115) may define the areas based on real time traffic conditions. In some embodiments, the area selector (115) may implicitly define the areas based on a measure of distance to the location of interest. The measure of distance may be a line-of-sight distance, a driving distance, a walking distance, an estimated travel time, etc. The sorter (117) may sort the listings (121) according to the measure of distance to split the set of listings into groups using one or more thresholds.

In one embodiment, the area selector (115) analyzes the distribution of the location (119) relative to the location of interest (131), identifies clustering of the listings (121) along distance to the location of interest (131), and divides areas or groups based on clustering of the listings. For example, the area selector (115) can group listings with similar distances to the location of interest (131) together based on an analysis of the clustering of the listings.

In one embodiment, the area selector (115) selects the sizes of the areas to cause the numbers of listings in the corresponding areas to be approximately equal to, or the same as, a predetermined number.

Figure 3:
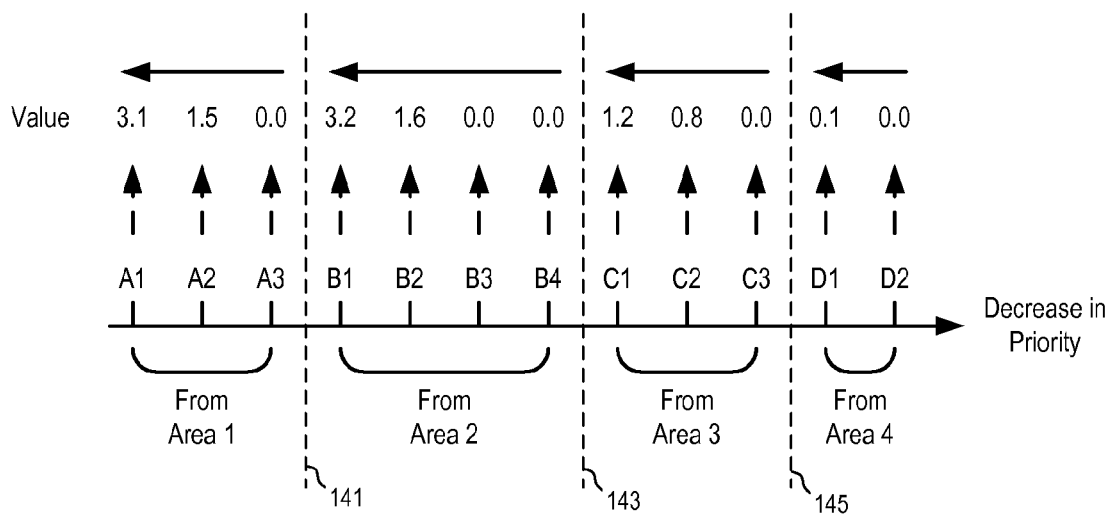
FIG. 3 illustrates a method to order groups of location dependent information according to one embodiment.

FIG. 3 illustrates a method to order groups of location dependent information according to one embodiment.

In FIG. 3, the listing groups are in an order according distance to the location of interest (131). For example, the first group of listings (121) (A1-A3) from Area 1, located within the boundary (133), has priority higher than the second group of listings (121) (B1-B4) from Area 2, located within the boundaries (133 and 135), since Area 1 is closer to the location of interest (131) than Area 2. Similarly, the third group of listings (121) (C1-C3) from Area 3, located within the boundaries (135 and 137), has priority lower than the second group of listings (121) (B1-B4) but higher than the fourth group of listings (121) (D1-D2), based on the distance to the location of interest (131).

In FIG. 3, within each of the groups, separated by the group boundaries (141, 143, 145), the listings (121) are sorted according to a value associated with the listings (121). The value may be based on an advertisement fee paid or offered by the entities of the listings (121), the status of whether an entity of a listing (121) is an advertiser, the price offered by an entity of a listing (121) for its service or product, a user rating of an entity of a listing (121) computed by the sorter (117) (or another module not shown in FIG. 1) based on feedbacks from prior customers of the entity, a popularity of an entity (e.g., connection in a social network to other entities, a rate of being selected by customers, etc.), a score indicative of relevance between the listing of an entity and the search criterion specified by the end user (101), etc. The value may be a combined value based on a plurality of parameters, which may include a measure of distance to the location of interest.

As illustrated in FIGS. 2 and 3, although listing (121) A2 is closer to the location of interest (131) than listing (121) A1, listing (121) A1 has a higher priority than listing (121) A2, since listings (121) A1 and A2 are in the same group from the Area 1 and listing (121) A1 has an associated value (3.1) higher than the associated value (1.5) of listing (121) A2. Although listing (121) B1 has an associated value (3.2) higher than listing (121) A1 or A2, listing (121) B1 has a priority lower than listing (121) A1 or A2, because the group for listing (121) B1 is farther way from the location of interest (131) than the group for listing (121) A1 and A2.

Sorting the listings (121) according to the scheme illustrated in FIG. 3 is equivalent to sorting the listing (121) according to the measure of distance and then splitting the sorted set into subsets according to a number of threshold values for the measure of distance, and then sorting the each of the subsets according to another value. It is also equivalent to assigning the listing (121) to groups according to a measure of distance, sorting the listing (121) based on the distance from the groups to the location of interest as a primary parameter and sorting the listing (121) based on another parameters as a secondary parameter (for listing (121) having the same values for the primary parameter).

When the search engine (113), the area selector (115) and the sorter (117) sort the listings (121) according to the scheme illustrated in FIG. 3 for the presentation of their listings (121), the web server(s) (107) can present the listings (121) in an overall order according to the distance to the location of interest (131), since the listing groups are presented in the order of the distance to the location of interest (131). Thus, the results are highly localized and relevant to the user.

However, the value used by the sorter (117) to sort the listings (121) within the groups can motivate the business entities of the listings (121) to perform certain tasks to improve their rankings within their group. For example, the entities may want to become an advertiser to be ranked by the sorter (117) higher in the competitors near them; the entities may want to improve their services and/or products to improve their user ratings; the entities may want to improve their popularity, etc., when the sorter (117) uses these parameters (e.g., user ratings, popularity, advertiser status) in ranking the listings (121) within the groups.

FIG. 4 illustrates an example of presenting location dependent listings according to one embodiment.

In FIG. 4, a user terminal (103) presents a search user interface (150). The search user interface (150) includes a search button (161), an input box (162) to receive one or more keywords, an input box (163) to receive a location of interest (131). The end user (101) may alternatively use the icon button (165) to select the location of interest (131) from an interactive map.

In one embodiment, the current location of the user terminal (103) that presents the search user interface is determined automatically by the user terminal (103) (e.g., via a global positioning system (GPS) unit) or by the location detector (111). The automatically determined location of the user terminal (103) can be a default location displayed by the input box (163); and the user may specify an alternative location via the input box (163) or the map button (165).

In FIG. 4, after the end user (101) specifies the keyword in the input box (161) and/or the location of interest in the input box (163), the end user (101) can select the search button (161) to submit the search request to web server(s) (107).

In FIG. 4, the search user interface (150) presents the search results under the input boxes (161 and 163). In the example illustrated in FIG. 4, the search user interface (150) presents the listings (121) of business products and services in response to a search request from the end user (101).

In FIG. 4, the search user interface (150) presents the listings (121) of different groups in the order of distance to the location of interest. For example, the listing "Hybrid Cars" and the listing "Imported Cars" are in one group that are closer to the location of interest (131) than other groups, such as the group that contains the listing "European Cars". Thus, the search user interface (150) presents the group containing the listing "Hybrid Cars" and the listing "Imported Cars" above other groups of listings.

In FIG. 4, the sorter (117) sorts the listings with each group according to user ratings. For example, the listing "Hybrid Cars" has a four-star rating, which is higher than the three-star rating of the "Imported Cars"; thus, the search user interface (150) presents the listing "Hybrid Cars" above the listing "Imported Cars", although the listing "Imported Cars" is closer to the location of interest than the listing "Hybrid Cars".

Although the listing "European Cars" has a five-star rating higher than the three-star rating of the listing "Imported Cars" (and the four-star rating of the listing "Hybrid Cars"), the search user interface (150) presents the listing "European Cars" below the listing "Imported Cars", since the listing "European Cars" belongs to a group that is farther away from the location of interest than the group to which the listing "Imported Cars" belongs.

In FIG. 4, the search user interface (150) presents a listing (121), such as the listing "Hybrid Cars", with various information about the entity of the listing (121), including a telephone contact (153), a distance (155) to the location of interest, a user rating (151), and options (157) to contact the entity via other communication channels and/or to obtain additional information via other communication channels. In one embodiment, the listing represents a listing (121) of a business of products or services. The technologies disclosed herein can be used, for example, in a web site such as Yellowpages.com. The business entity of the listing may pay a fee to become an advertiser or not pay a fee to have a free listing.

In one embodiment, the advertiser pays a predetermined fee for priority in the display of the listings. For example, the advertiser may pay a monthly advertisement fee, or an advertisement fee charged for a predetermined number of presentations, to obtain a high priority in the ranking of the listings (121) with its group (e.g., when the sorter (117) sorts the listings (121) within the groups according to the status of whether the listing (121) is from an advertiser, and/or the advertisement fee paid or to be paid by the advertiser).

In another embodiment, the advertiser pays a predetermined fee when a link presented in the listing (121) forwards the end user to a web location specified by the advertiser, such as a web site of the advertiser. In one embodiment, the advertiser pays a predetermined fee when the end user calls the advertiser using the telephone contact provided by the listing.

In one embodiment, the predetermined advertisement fees are specified and requested by the operator of the search engine (113). In another embodiment, the predetermined advertisement fees are specified and offered by the advertiser of the listing (121); and the advertisers can adjust the offer of the advertisement fees to balance the need for a high ranking with their group and the cost.

In FIG. 4, the listings (121) provide the "Call" link to allow a customer to request a call back to the customer for a phone connection to the advertiser. When a telephonic device (e.g., a mobile phone or a computer having a phone implemented partially via software, etc.) presents the listing, the customer can use the "call" link to initiate a call from the telephonic device.

In FIG. 4, the listings provide the "Email" link to send the listing and/or the phone number via email to an address specified by the user. The user can select the menu (157) for more options, such as an option to send the phone number via SMS, an option to save the listing as a note, an option to bookmark the listing, etc.

In FIG. 4, the listings also include links related to customer ratings of the businesses based on feedback from prior customers of the business. For example, a user may read reviews wrote by other users, or to write and/or rate the business.

In some embodiments, the listings (121) include banner or video advertisements from the corresponding entities of the listings (121). The listings (121) may include links to web locations specified by the advertisers.

For example, in one embodiment, the heading "Hybrid Cars" includes a link to a web site to the business/advertiser of the listing. When the end user (101) selects the link, the link directs the end user (101) to the web site of the business/advertiser; and the advertiser may pay a per-selection advertisement fee, for the end user that is directed by the link to the web site of the business/advertiser.

Alternatively or in combination, the end user (101) may call the telephone contact (153) provided by the listing (121); when the telephone call from the end user is connected to the business/advertiser, the advertiser may pay a per-call advertisement fee, for the call that is directed by the telephone contact (153) to the business/advertiser.

In one embodiment, to track the calls forwarded by the listing (121) to the business/advertiser, the listing provides a telephone number of a connection server as the telephone contact (153) of the listing. When the connection server receives the call to the telephone number of the connection server, the connection server forwards the call to the telephone number of the business/advertiser, or makes a separate call to the telephone number of the business/advertiser and bridges the calls to make the connection.

Figure 5:
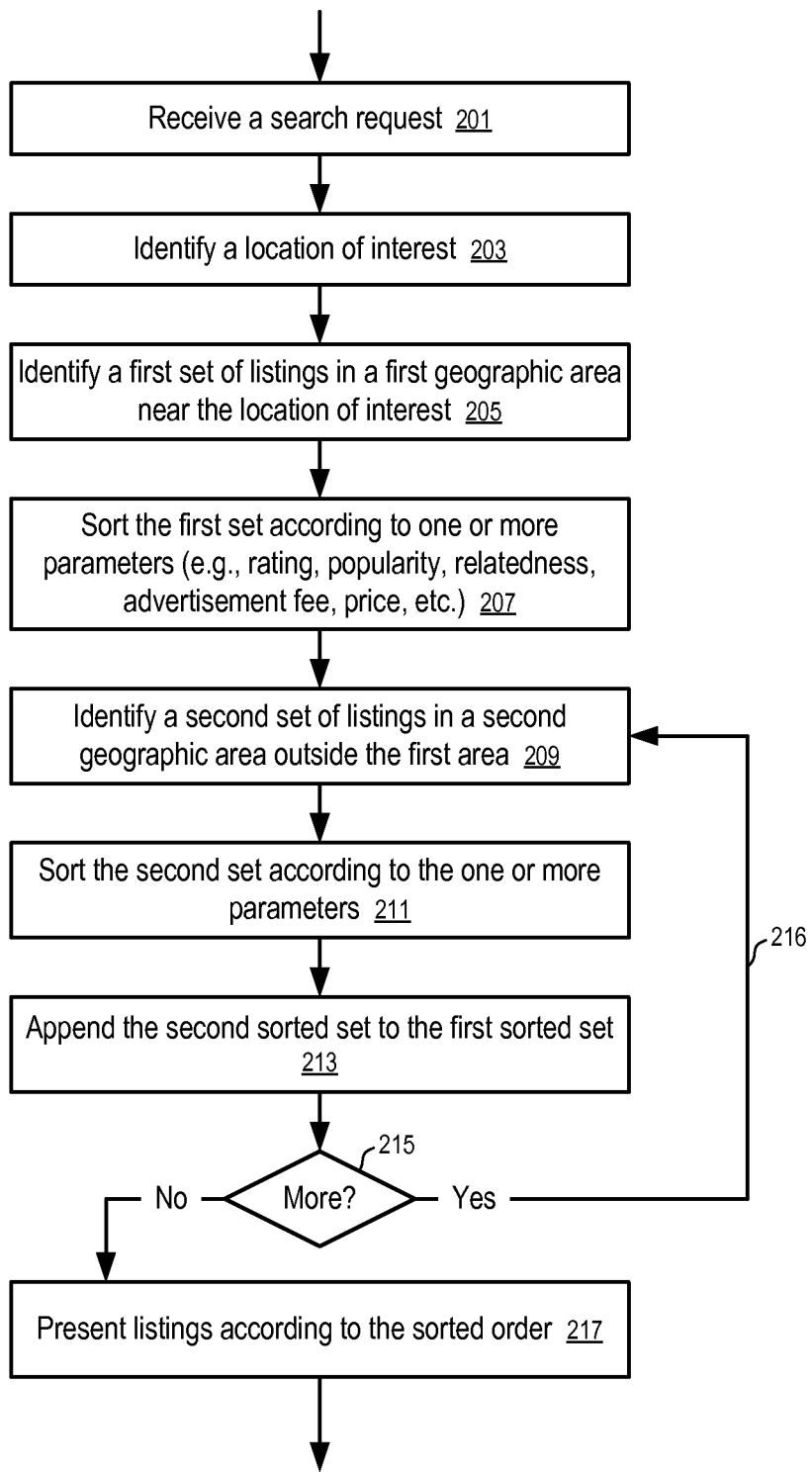
FIG. 5 shows a process to present location dependent information according to one embodiment.

FIG. 5 shows a process to present location dependent information according to one embodiment.

In FIG. 5, a server receives (201) a search request. In one embodiment, the server is the web server (107). Alternatively, the server may be a gateway for receiving requests via email, SMS, IM, telephone, or other types of communication channels.

In response to the search request, the location detector (111) identifies (203) a location of interest; and the search engine (113) and/or the area selector (115) identifies (205) a first set of listings (121) in a first geographic area near the location of interest. The sorter (117) sorts (207) the first set according to one or more parameters (e.g., rating, popularity, relatedness, advertisement fee, price, etc.) to generate a first sorted set.

The search engine (113) and/or the area selector (115) further identifies (209) a second set of listings (121) in a second geographic area outside the first area. The sorter (117) further sorts (211) the second set according to the one or more parameters (e.g., advertisement fee, user rating, and popularity, price, availability, relatedness of the listings of the entities to the keyword of the search request, etc.) to append (213) the second sorted set to the first sorted set.

In one embodiment, the area selector (115) identifies the first and second geographic areas based on clustering of listings (121) along distance to a location of interest.

The operations (209-213) are repeated (216) if operation (215) determines that more results are needed, or if more geographic areas need to be searched. For example, the search engine (113) and/or the area selector (115) may further identify a third set of listings in a third geographic area outside the second area. The sorter (117) further sorts the third set according to the one or more parameters to append the third sorted set after the second sorted set.

In one embodiment, the first geographic area is substantially centered at the location indicated in the search request; the second geographic area is a ring of area surrounding the first geographic area; and the third geographic area is a ring of area surrounding the second geographic area, as illustrated in FIG. 2. In one embodiment, the area selector (115) adjusts the size of the geographic areas according to a desired number of listings to be identified in the first geographic area (e.g., in response to the search request).

After the operation (215) determines that sufficient results are obtained, or after a desired geographic area has been searched, the web server (107) provides (217) the listings (121) to the user terminal (103) for presentation according to the sorted order.

In some embodiments, the web server (107) selects a portion of the sorted listings for presentation via the user terminal (103). In some embodiments, the web server (107) or the user terminal (103) divides the search results for presentation in multiple pages. Some embodiments use a different server to provide the search result to the user terminal (103), or a different terminal (103). For example, the email gateway (106a) may provide the search result via email; the telephone gateway (106d) may provide the search result via telephone; the IM gateway (106b) may provide the search result via instant messages; and other gateways not shown in FIG. 1 may provide results via fax, SMS, television, etc.

Figure 6:
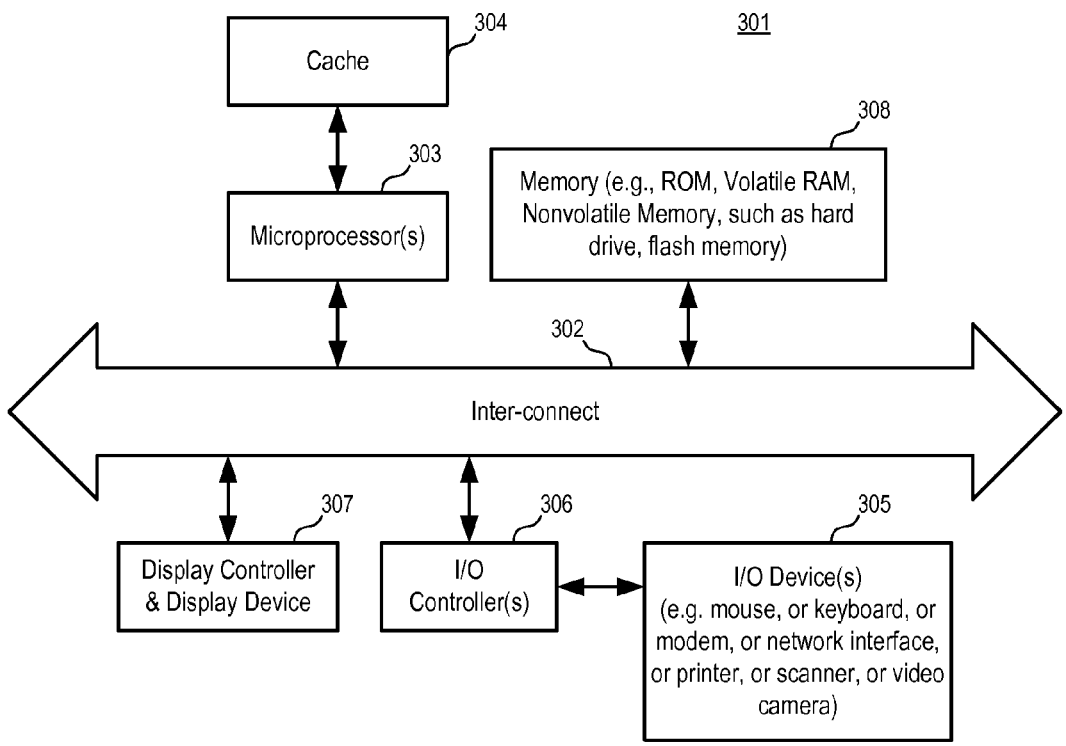
FIG. 6 illustrates a data processing system which can be used in various embodiments.

FIG. 6 illustrates a data processing system which can be used in various embodiments. While FIG. 6 illustrates various components of a computer system, it is not intended to represent any particular architecture or manner of interconnecting the components. Other systems that have fewer or more components may also be used.

In one embodiment, a server data processing system as illustrated in FIG. 6 is used as each of the web server(s) (107), the location detector (111), the search engine (113), the area selector (115), the sorter (117), and/or storage devices for locations (119) and listings (121), etc. In some embodiments, one or more servers (e.g., 107, 111, 113, 115, 117) of the system can be replaced (e.g., by a system designer) with the service of a peer to peer network of a plurality of data processing systems, or a network of distributed computing system. The peer to peer network, or a distributed computing system, can be collectively viewed (e.g., by the reader of the description) as a server data processing system.

In one embodiment, a data processing system as illustrated in FIG. 6 is used as the user terminal (103) and/or to provide the search user interface illustrated in FIG. 4.

In FIG. 6, the data processing system (301) includes an inter-connect (302) (e.g., bus and system core logic), which interconnects a microprocessor(s) (303) and memory (308). The microprocessor (303) is coupled to cache memory (304) in the example of FIG. 6.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art. In some embodiments, when the data processing system is used a server system, some of the I/O devices, such as printer, scanner, mice, keyboards are optional.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs". The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
    processing, via a computing device, a search query;
    processing, via the computing device, information about a first location;
    responsive to the search query:
    identifying, via the computing device, an area proximal to the first location;
    identifying, via the computing device, listings of service providers that correspond to a service category, which service providers have locations proximal to the first location;
    selecting, via the computing device, a first geographic area based at least in part on one or more of:
        a first set of locations corresponding to at least some of the listings of the service providers;
        a first distance from the first location; and/or
        a first travel time from the first location;
    selecting, via the computing device, a second geographic area based at least in part on one or more of:
        a second set of locations corresponding to at least some of the listings of the service providers;
        a second distance from the first location, the second distance being greater than the first distance; and/or
        a second travel time from the first location, the second travel time being greater than the first travel time; and
    sorting, via the computing device, each of a first set of the listings of the service providers having the first set of locations corresponding to the first geographic area and a second set of the listings of the service providers having the second set of locations corresponding to the second geographic area based at least in part on one or more parameters other than distance, wherein the sorting generates a first sorted et of the listings of the service providers having the first set of locations corresponding to the first geographic area and a second sorted set of the listings of the service providers having the second set of locations corresponding to the second geographic area.

2. The method of claim 1, wherein the one or more parameters comprise a first parameter and a second parameter, the first parameter being different from the second parameter, and wherein the sorting comprises:
    sorting the first set of the listings of the service providers having the first set of locations corresponding to the first geographic area based at least in part on the first parameter; and sorting the second set of the listings of the service providers having the second set of locations corresponding to the second geographic area based at least in part on the second parameter.

3. The method of claim 1, wherein the selecting of the first geographic area and/or the second geographic area is performed prior to the identifying the listings of service providers that correspond to the service category.

4. The method of claim 1, wherein the identifying the listings of service providers that correspond to the service category is performed prior to the selecting of the first geographic area and the second geographic area.

5. The method of claim 1, wherein the first location comprises:
an automatically-gathered location; and/or
a user-entered location.

6. The method of claim 5, wherein the automatically-gathered location comprises a position of a user computing device identified at least in part with the user computing device and/or location information from a source external to the user computing device.

7. The method of claim 1, wherein the selecting the first geographic area comprises:
defining a shape of the first geographic area.

8. The method of claim 7, wherein the defining the shape of the first geographic area is based at least partially on one or more boundaries according to a map.

9. The method of claim 8, wherein the defining the shape of the first geographic area is based at least partially on scaling the one or more boundaries according to the map.

10. The method of claim 1, wherein the selecting the first geographic area comprises:
defining a size of the first geographic area.

11. The method of claim 10, wherein the defining the size of the first geographic area is based at least partially on a number of the first set of locations corresponding to at least some of the listings of the service providers.

12. The method of claim 10, wherein the defining the size of the first geographic area is based at least partially on clustering of the first set of locations corresponding to at least some of the listings of the service providers.

13. The method of claim 10, wherein the defining the size of the first geographic area is based at least partially on the first distance from the first location, the first distance from the first location being one of a line-of-sight distance or a traveling distance.

14. The method of claim 10, wherein the defining the size of the first geographic area is based at least partially on the first travel time from the first location.

15. The method of claim 1, wherein at least one of the one or more parameters is based on at least one of advertisement fee, user rating, and/or popularity.

16. A system comprising:
one or more network interfaces accessible from a network;
one or more repositories to retain listing information about service providers;
one or more processors coupled to at least one of the one or more network interfaces and to at least one of the one or more repositories, the one or more processors to execute instructions to:
process a search query;
process information about a first location;
responsive to the search query:
identify an area proximal to the first location;
identify listings of service providers that correspond to a service category, which service providers have locations proximal to the first location;
select a first geographic area based at least in part on one or more of:
a first set of locations corresponding to at least some of the listings of the service providers;
a first distance from the first location; and/or
a first travel time from the first location;
select a second geographic area based at least in part on one or more of:
a second set of locations corresponding to at least some of the listings of the service providers;
a second distance from the first location, the second distance being greater than the first distance; and/or
a second travel time from the first location, the second travel time being greater than the first travel time; and
sort each of a first set of the listings of the service providers having the first set of locations corresponding to the first geographic area and a second set of the listings of the service providers having the second set of locations corresponding to the second geographic area based at least in part on one or more parameters other than distance, wherein the sorting generates a first sorted et of the listings of the service providers having the first set of locations corresponding to the first geographic area and a second sorted set of the listings of the service providers having the second set of locations corresponding to the second geographic area.

17. The system of claim 16, wherein the first location comprises:
an automatically-gathered location; and/or
a user-entered location.

18. A non-transitory machine-readable medium having machine-readable instructions thereon which, when executed by one or more computers or other processing devices, cause one or more computers or other processing devices to:
process a search query;
process information about a first location;
responsive to the search query:
identify an area proximal to the first location;
identify listings of service providers that correspond to a service category, which service providers have locations proximal to the first location;
select a first geographic area based at least in part on one or more of:
a first set of locations corresponding to at least some of the listings of the service providers;
a first distance from the first location; and/or
a first travel time from the first location;
select a second geographic area based at least in part on one or more of:
a second set of locations corresponding to at least some of the listings of the service providers;
a second distance from the first location, the second distance being greater than the first distance; and/or
a second travel time from the first location, the second travel time being greater than the first travel time; and
sort each of a first set of the listings of the service providers having the first set of locations corresponding to the first geographic area and a second set of the listings of the service providers having the second set of locations corresponding to the second geographic area based at least in part on one or more parameters other than distance, wherein the sorting generates a first sorted et of the listings of the service providers having the first set of locations corresponding to the first geographic area and a second sorted set of the listings of the service providers having the second set of locations corresponding to the second geographic area.

19. The non-transitory machine-readable medium of claim 18, wherein the selecting of the first geographic area and/or the second geographic area is performed prior to the identifying the listings of service providers that correspond to the service category.

20. The non-transitory machine-readable medium of claim 18, wherein the identifying the listings of service providers that correspond to the service category is performed prior to the selecting of the first geographic area and the second geographic area.

* * * * *